Sept. 16, 1958   C. W. KRUSE   2,852,519
METHOD FOR PRODUCING ESTERS OF HETEROCYCLIC
NITROGEN CARBOXYLIC ACIDS
Filed Dec. 27, 1954
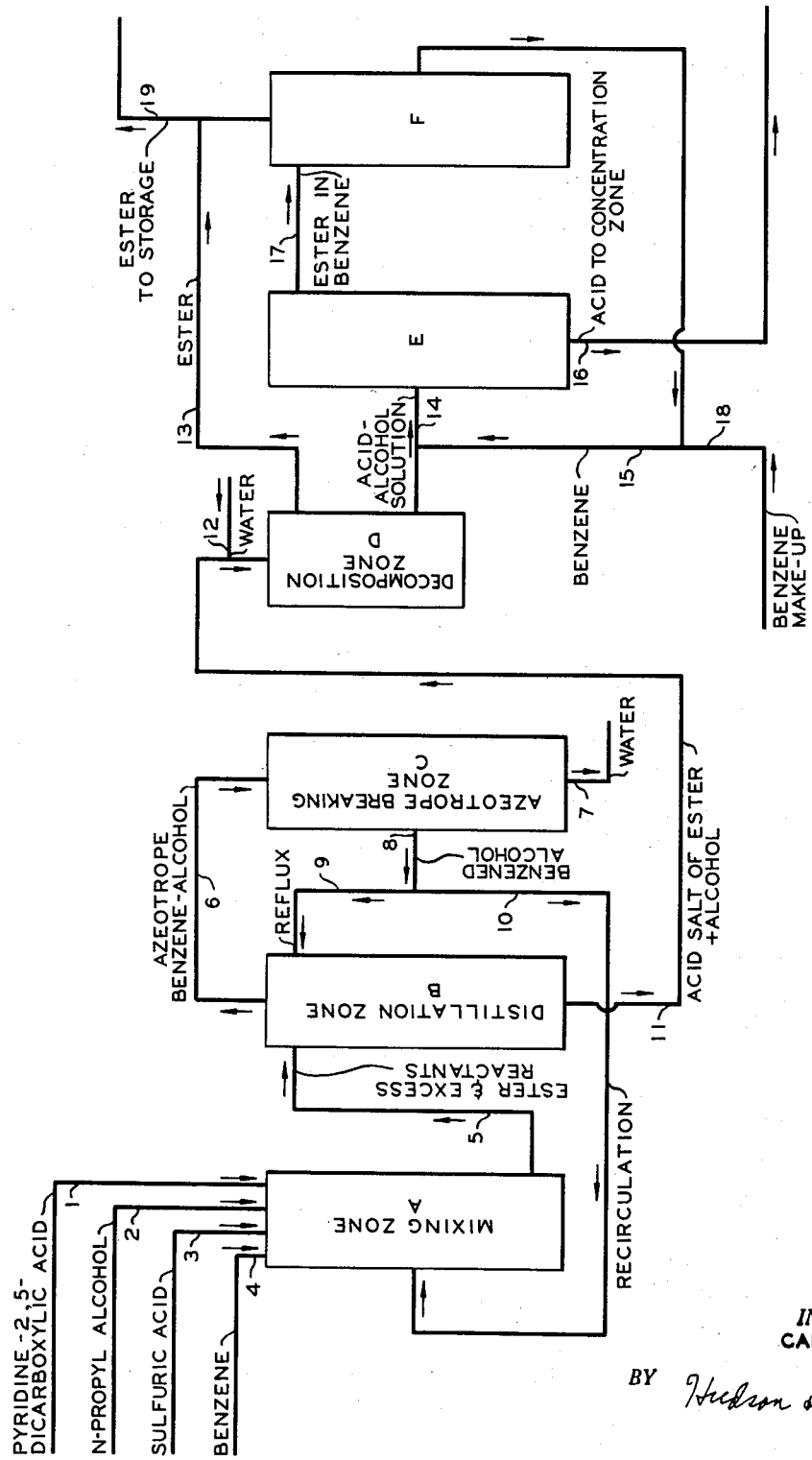
INVENTOR.
CARL W. KRUSE
BY *Hudson & Young*
ATTORNEYS

2,852,519

METHOD FOR PRODUCING ESTERS OF HETEROCYCLIC NITROGEN CARBOXYLIC ACIDS

Carl W. Kruse, Urbana, Ill., assignor to Phillips Petroleum Company, a corporation of Delaware Application December 27, 1954, Serial No. 477,712

9 Claims. (Cl. 260—287)

This invention relates to a novel method of producing esters of organic heterocyclic nitrogen containing acids.

In one of its aspects this invention relates to a novel process for the production of esters of pyridine carboxylic acids or their homologs, wherein the ester produced by the reaction of the saturated and unsaturated aliphatic and alicyclic alcohols with mono-, di- and polycarboxylic acids of pyridine and quinoline having at least one carboxy group in the alpha position (i. e. position alpha to the hetero nitrogen atom) may be recovered in much greater yields than has previously been possible.

It is well known in the art that many organic compounds of nitrogen especially those containing a heterocyclic nitrogen atom such as those of the pyridine and quinoline series, are capable of forming water soluble acid salts with inorganic mineral acids such as hydrochloric acid. For example, pyridines and quinolines in hydrocarbon oils can be treated with an acid and separated from the oil by dissolving the soluble salt in water. The nitrogen containing compound can then be recovered by neutralizing the acid salt with a base or basic compound and the material can then be separated from the aqueous solution by distillation. It is also well known that esters are prepared by the reaction between an organic acid and an alcohol in the presence of an inorganic acid catalyst such as concentrated sulfuric or hydrochloric acid. In the preparation of esters from alcohols and organic acids containing a heterocyclic nitrogen, for example, carboxyl substituted pyridines and quinolines, a portion of inorganic acid neutralizes the nitrogen base of the nitrogen containing acid forming the pyridinium or quinolinium salt. The remainder of the acid serves as esterification catalyst. As would be expected, the esters formed under these conditions are found to exist as the acid salts of the esters. To recover the esters, the practice has been to neutralize the excess acid with a base using sufficient base to react with the inorganic acid portion of the salt thereby freeing the ester. The ester could then be recovered by distillation. However, by such a procedure the esters were subject to hydrolysis reverting to the acid and alcohol in the presence of the neutralizing base.

Many of these esters are excellent fly repellants. These esters are also useful as intermediate in manufacture of other chemicals such as bactericides, etc.

An object of this invention is to provide a method of improving the recovery of free esters from acid salts of esters of organic heterocyclic nitrogen containing acids.

Other objects and advantages of this invention will be apparent to those skilled in the art being given this disclosure and claims.

I have now discovered a method wherein the esters produced by the reaction of the saturated and unsaturated aliphatic and alicyclic alcohols and the mono-, di- and polycarboxylic acids of pyridine and quinoline and their derivatives having at least one of the carboxy groups in the alpha position to the heterocyclic nitrogen may be recovered in much greater yields than has previously been possible. I have found that the acid salts of these esters when poured into an excess amount of water, decompose to yield the pure ester without any hydrolysis of the ester taking place. The method of this invention comprises preparing the ester by reacting an alcohol and an acid of pyridine or quinoline in the presence of a concentrated mineral acid catalyst such as sulfuric acid to produce the acid salt of the ester of the particular pyridine or quinoline acid, and causing the acid salt to decompose to the ester by mixing the salt with an excess of water. The ester will separate as an organic layer and the acid will remain in the water. In contrast, when the acid salts of pyridine or quinoline are poured into water, the salt enters into solution. The ester is slightly soluble in the acidic aqueous phase and any ester dissolved in the aqueous phase can be recovered by extraction with a suitable solvent such as benzene. Such organic extraction methods are well known in the art. The solvent and ester can be separated by distillation. The ester can be separated from any unesterified organic material by distillation. In order to substantially convert all of the organic acid, an excess of alcohol will generally be required. Generally sufficient mineral acid will be used to at least neutralize the base groups of the pyridine base however, lesser amounts can be used. The solubility of the dicarboxylic acid in the alcohol is greatly improved by the use of the mineral acid and satisfactory solubility and esterification rates is generally obtainable with 50 percent of theoretical acid required to neutralize the pyridine base groups, however, even smaller amounts of mineral acid are operable. As the mineral acid approaches the stoichiometric amount required to react with the pyridine base, the solubility and esterification rate is generally improved and I generally prefer to use at least 90 percent of theoretical and more frequently prefer to use a small excess of said stoichiometric amounts. The water of formation must be removed as formed in order for the reaction to continue to completion. The water of formation can be removed by use of dehydrating agents, by forming a minimum boiling point azeotrope which can be continually removed by distillation, or by any other dehydrating means. Frequently a third component is added to the reaction to form a ternary azeotrope to remove the water.

If desired, any free acid (i. e. not present as a pyridinium or quinolinium salt) can be neutralized prior to recovery of the ester. However, any further neutralization will tend to cause hydrolysis of the ester and reduce the yield.

As has been hereinbefore indicated the acids from which the esters can be made are organic heterocyclic nitrogen containing carboxylic acids wherein one carboxy group is on an alpha carbon. In general, the acids most commonly known and used of this type are pyridine and quinoline carboxylic acids containing not more than 3 carboxyl groups. The pyridine or quinoline ring can be further substituted with additional hydrocarbon groups, but in general such groups will contain not more than 4 carbon atoms each. Representative of such acids are: 2-pyridinecarboxylic, 2,3 - pyridinedicarboxylic, 5 - ethyl-2 - pyridinecarboxylic, 4 - methyl - 2 - pyridinecarboxylic, isocinchomeronic, lutidinic, berberonic, 2,3,4-pyridinetricarboxylic, 2 - quinolinecarboxylic, 6 - ethyl - 2 - quinolinecarboxylic, 4 - methyl - 2 - quinolinecarboxylic, 2,3-quinolinedicarboxylic acids, and the like.

Alcohols suitable for the practice of this invention are saturated and unsaturated aliphatic and alicyclic alcohols, generally containing not more than 10 carbon atoms. Representative of such alcohols are methyl, ethyl, allyl, teritary butyl, cyclohexyl, n-heptyl, iso-octyl, n-decyl alcohols and 3 - pentene - 1 - ol.

Strong mineral acids which can be used in the practice of this invention are preferably those which are strongly ionized such as sulfuric, phosphoric, hydrochloric, and the like.

The esters which can be recovered in higher yields by the method of this invention can be full esters, half esters or mixed esters.

As has been indicated, a third component is often added to the esterification zone which will form a ternary, minimum boiling azeotrope with the alcohol and water. Preferably this third component should form a minimum boiling heterogeneous azeotrope in order that the components can then be separated by conventional means. These azeotrope forming materials are generally hydrocarbon in nature however other organic liquids can be used. Azeotrope forming compounds are known in the art and it is within the skill of the art to select the proper material for the particular separation and which will not react with the product. For a list of typical azeotropes, their boiling points, etc., see Industrial and Engineering Chemistry 19; August 1947, p. 508.

This invention will be further described with reference to the attached drawing which is a block flow diagram of one embodiment of suitable means for the practice of this invention.

2,5-pyridine dicarboxylic acid, also known as isocincho meronic acid, and having a formula which can be represented by:

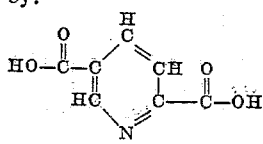

is representative of the heterocyclic nitrogen containing acid which can be esterified in high yields by this method. When this compound is esterified with n-propyl alcohol in the presence of sulfuric acid, the sulfate salt of di-n-propyl ester of 2,5-pyridine dicarboxylic acid is formed. This latter compound is represented by the formula:

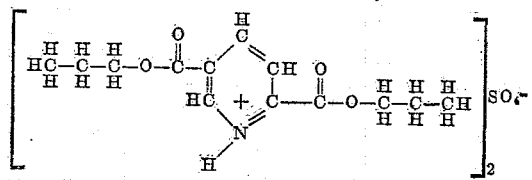

However, since the nitrogen of the ester is a weak base, the salt may in fact be the bisulfate in which case the negative ion will be $HSO_4^-$ and, of course, only one positive ion is required for the negative ion.

From the above, it can be seen that one mol of $H_2SO_4$ will neutralize either one or two mols of the heterocyclic nitrogen base. Had HCl been used as the acid, one mol of HCl would have neutralized one mol of heterocyclic nitrogen base as follows:

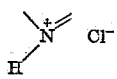

In any case, the acid salt is decomposed in water and the ester is recovered as an oily phase while the acid is recovered as an aqueous phase. These two phases can be separated without further treatment but extraction of the aqueous phase with a suitable solvent (usually a hydrocarbon of 4 to 8 carbon atoms which may be straight-chain, branched-chain, aromatic, or alicyclic) such as benzene will recover the very small amount of ester which is dissolved in the aqueous phase and hence increase the yield even further.

A continuous process for the production of the di-n-propyl ester of pyridine-2,5-dicarboxylic acid is described in connection with the attached drawing. Referring now to the drawing, 2,5-pyridine dicarboxylic acid passes to mixing zone A via conduit 1, n-propyl alcohol via conduit 2, sulfuric acid via conduit 3 and benzene via conduit 4. These ingredients are thoroughly mixed and passed to distillation zone B via conduit 5. Sufficient acid is used to neutralize the base in the pyridine acid with a small excess which serves as a catalyst. An excess amount of alcohol is used and sufficient benzene is used to form the alcohol-water-benzene azeotrope. The pyridine acid is esterified with the alcohol in the presence of a mineral acid forming the acid salt of the ester and freeing water. The water, n-propyl alcohol and benzene form an azeotrope which boils at 68.48° C. and contains 8.6% water, 9% propanol, and 82.4% benzene. Since water boils at 100° C., propanol at 97.2° C. and benzene at 80.2° C. it can be seen that the azeotrope boils at a lower temperature than do any of its components. The azeotrope, benzene and most of the excess propanol is separated from the other components in zone B as overhead via conduit 6. By removing the water as it forms, the esterification can go to completion. If the water is not removed, the esterification will reach an equilibrium condition where no further esterification takes place. By continuously removing the water, the equilibrium is shifted and the esterification of the acid can be carried to completion. The azeotrope passes to separation zone C where the azeotrope can be broken by any suitable means. The water is separated and removed via conduit 7 and the benzene and propanol are removed via conduit 8. Part of this material is returned to zone B as reflux via conduit 9 and the remainder returned to the mixing zone A via conduit 10.

Acid salt of the ester along with some propanol is removed as bottom from zone B via conduit 11 and passed to decomposition zone D where it is mixed with water from conduit 12. The acid salt decomposes and the mixture separates into an oily layer and an aqueous layer. The oily layer containing the ester along with a very small amount of propanol not removed at B is separated and sent to storage via conduit 13. The water layer containing the acid and propanol along with a small amount of dissolved ester passes via conduit 14 to separation zone E. Benzene is introduced into conduit 14 from conduit 15 and serves to extract the dissolved ester from the acid aqueous solution. The benzene and acid solution separates as two phases in zone E and the acid phase containing most of the propanol is removed via conduit 16 to an acid concentration zone (not shown). The benzene phase passes to distillation zone F via conduit 17. The benzene is separated from the ester by distillation and is returned to conduit 14 via conduit 15. Make up benzene is supplied via conduit 18. The ester is removed from F via conduit 19 and sent to ester storage (not shown).

I have described this invention in one of its embodiments. Those skilled in the art will see many modifications which can be made without departing from the scope of this invention. For example, I have shown the separation of the water from the benzene alcohol mixture in zone C. The benzene and the alcohol-water solution forms two phases which can be separated by phase separation means, or the water can be removed by means of dehydrating agents. If a solid dehydrating agent such as say calcined lime (CaO) is used, the benzene and alcohol can be removed by filtration. As has been indicated, the breaking of the azeotrope is within the skill of the art and can be varied as desired or even the mixture can be discarded.

I will further illustrate the advantages of this invention by the following examples:

EXAMPLE I

Three runs were made wherein esterification conditions varied and the ester recovered by the prior art method of neutralization. In each case the yield was about 84 percent based on the pyridine dicarboxylic acid.

In the first run 1365 grams of 2,5-pyridine dicarboxylic acid, 2.5 liters (2010 g.) of n-propyl alcohol, 210 ml. sulfuric acid (concentrated), and 1200 ml. (1055 grams)

of benzene were charged to a 3-necked glass flask fitted with a stirrer, a thermometer, and an azeotrope trap of 450 ml. capacity. The mixture was maintained at a temperature in the range between 80 and 90° C. and refluxed for 24 hours. At this point the azeotrope trap was opened and all the distillate was allowed to go overhead. Distillation was continued, with the trap open, until the pot temperature rose to 113° C.

The reaction mixture was cooled to 20° C. and 500 ml. of 28 percent aqueous ammonia was added rapidly. In order to obtain better phase separation, 650 ml. of water was added at this point to dissolve the ammonium sulfate formed and thereby form a phase more dense than the ester. A further addition of 1700 ml. of water was made as a final wash and the densities were such that the layers separated readily. The organic layer was removed and distilled under reduced pressure (0.7 to 0.3 mm. of mercury). The aqueous phase was extracted with n-heptane and the ester recovered by distillation and is added to the recovered ester from the organic phase. A yield of 84 percent based on 90 percent pure pyridine dicarboxylic acid was obtained.

In run 2 the charge to the flask was 1365 grams of 2,5-pyridine dicarboxylic acid, 2.5 liters (2010 g.) of n-propyl alcohol, 1200 ml. (1055 g.) of benzene, and 210 ml. of sulfuric acid (concentrated). This mixture was maintained at a temperature in the range between 80 and 90° C. and refluxed for 59½ hours. The azeotrope trap was then opened and its contents removed and the distillation continued until the pot temperature rose to 127° C.

The reaction mixture was cooled and 500 ml. of 28 percent aqueous ammonia added. To the neutralized solution water was added in 500 ml. and 1500 ml. portions. The organic layer was recovered and distilled as described for run 1 and the water phase extracted with n-heptane. The yield of ester was 85 percent based on 90 percent purity of the pyridine dicarboxylic acid.

In a third run the charge was the same as in the other two runs and the esterification (refluxing) was carried on for 55 hours. After draining the azeotrope trap at the close of the esterification reaction the distillation was continued until the pot temperature rose to 130° C. After cooling, the mixture was neutralized by the addition of 500 ml. of 28 percent aqueous ammonia. Water was added to the neutralized mixture in 750 ml. of 1500 ml. portions. The organic layer was recovered and distilled under reduced pressure as previously described and the water phase was extracted with n-heptane. The yield obtained was 85 percent based on 90 percent purity of the pyridine dicarboxylic acid charge.

EXAMPLE II

In this example, no neutralizing base was used. The recovery of ester even without extraction of the aqueous phase is considerably higher than the recovery was by the prior art methods. This recovery is increased even more by extraction of the aqueous phase.

In this run the charge to the three-necked flask was 1365 grams of 2,5-pyridine dicarboxylic acid, 2.5 liters (2010 g.) of n-propyl alcohol, 210 ml. of sulfuric acid (concentrated) and 1150 ml. (1011 g.) of benzene. The mixture was maintained under esterification conditions (temperature in the range of 80–90° C.) for 46 hours after which the azeotrope trap was drained and the distillation continued until the temperature in the pot reached 118° C.

The reaction mixture from this run was divided into two parts, the first measuring 670 ml. the second 2000 ml. The first part was poured into the water and the oil phase was separated and washed. The washings were extracted with benzene and the combined oil phase and benzene extraction were distilled under reduced pressure. The yield on this portion was 97 percent based on 90 percent purity of the pyridine dicarboxylic acid.

The second portion consisting of 2000 ml. of the reaction mixture was poured into about four times its volume of water. The oil phase was separated and washed. No extraction of the water phase was made. Distillation of the organic phase was carried out under reduced pressure as before. The recovery from this portion was 92 percent of theoretical based on 90 percent purity of the pyridine carboxylic acid starting material.

From the above two examples, it can be seen that the yield was increased from a maximum of 85% based on the pyridine acid to 97%. The only difference in the two runs was in the recovery means employed and the low recovery in the first case was due to hydrolysis as is illustrated in Example III.

EXAMPLE III

The rate of hydrolysis of the esters of 2,5-pyridine dicarboxylic acid was checked in the following manner: Exactly 0.6305 gram of pure di-n-propyl ester of 2,5-pyridine dicarboxylic acid was weighed into a 200 ml. round bottomed flask. Exactly 50 ml. of absolute ethyl alcohol was added and the flask was placed in a 25.5° C. temperature bath. At time "zero" 50 ml. of 0.1012 N sodium hydroxide was added. At various time intervals, 10 ml. of aliquots were removed and added to 10 ml. of water in one ml. of 0.491 N hydrochloric acid to prevent further hydrolysis, since hydrolysis of these esters does not take place at any appreciable rate in acidic solution at room temperature. These aliquots were immediately titrated with 0.1012 N sodium hydroxide to determine the equivalents of base neutralized by the hydrolyzing ester. The results are tabulated below:

Table

| Time: | Percent hydrolyzed |
|---|---|
| 3 min | 60 |
| 5 min | 68 |
| 10 min | 74 |
| 20 min | 81 |
| 30 min | 84 |
| 40 min | 86 |
| 90 min | 92 |
| Equilibrium | 96.5 |

These data indicate that the rate of hydrolysis of the esters in a basic medium is extremely rapid, and as a result, the yield of desired ester which can be obtained from a given reaction mixture will be substantially greater if the mixture is not treated with any basic material during the recovery steps.

EXAMPLE IV

The rate of hydrolysis of the esters of the pyridine dicarboxylic acids was further demonstrated by the following experiment. A 1.255 gram sample of the di-n-propyl ester of 2,5-pyridine dicarboxylic acid was dissolved in 50–50 ethanol-water standardized solution of sodium hydroxide. After 1½ hours at room temperature, the excess base was titrated with standard acid. The ester was found to be 96% hydrolyzed. Similar tests were run on the dimethyl and diallyl esters of 2,5-pyridine dicarboxylic acid. The dimethyl ester was found to be 96% hydrolyzed after 45 minutes, and the diallyl ester was found to be 92% hydrolyzed after 30 minutes. This again demonstrates that hydrolysis is extremely rapid.

I claim:

1. The improvement in the process of producing esters of organic heterocyclic nitrogen containing acids selected from the group consisting of pyridine and quinoline carboxylic acids by reacting a heterocyclic nitrogen containing acid having at least one alpha-carboxy group with an alcohol in the presence of a mineral acid, said improvement comprising recovering the free ester of the organic acid by mixing the resulting reaction product in an excess of a medium consisting essentially of water.

2. The improvement of claim 1 wherein the oily phase resulting from the said mixing is separated from the resulting aqueous phase.

3. The improvement of claim 2 wherein said ester is an ester of pyridinecarboxylic acid containing 1 to 3 carboxylic groups per molecule with one of said groups being an alpha carbon atom and an alcohol selected from the group consisting of unsaturated aliphatic and alicyclic alcohols and the water of formation is continuously withdrawn during the esterification reaction.

4. The method of claim 1 wherein the mineral acid is selected from the group consisting of hydrochloric, phosphoric, and sulfuric acids.

5. The method of claim 4 wherein the heterocyclic nitrogen containing acid is isocinchomeronic acid and the alcohol is propyl alcohol.

6. The method of claim 4 wherein the heterocyclic nitrogen containing acid is picolinic acid and the alcohol is methyl alcohol.

7. The method of claim 4 wherein the heterocyclic nitrogen containing acid is quinolinic acid and the alcohol is ethyl alcohol.

8. The method of claim 4 wherein the heterocyclic nitrogen containing acid is 5-ethyl-2-pyridinecarboxylic acid and the alcohol is tertiary butyl alcohol.

9. The method of claim 4 wherein the heterocyclic nitrogen containing acid is 2,3,4-pyridinetricarboxylic acid and the alcohol is cyclohexyl alcohol.

References Cited in the file of this patent

UNITED STATES PATENTS

| | | |
|---|---|---|
| 2,431,463 | Carlson et al. | Nov. 25, 1947 |
| 2,485,152 | Hartmann et al. | Oct. 18, 1949 |
| 2,505,948 | De Groote et al. | May 2, 1950 |
| 2,738,352 | Bavley et al. | Mar. 13, 1956 |
| 2,758,999 | Aries et al. | Apr. 14, 1956 |

FOREIGN PATENTS

| | | |
|---|---|---|
| 563,171 | Great Britain | Aug. 2, 1944 |

OTHER REFERENCES

Billman et al.: J. Am. Chem. Soc., vol. 66, pp. 745–6 (1944).

Pailer et al.: Chem. Abstracts, vol. 47, col. 2186 (1953).

Engler: Ber. Deut. Chem., vol. 27, p. 1785 (1894).

UNITED STATES PATENT OFFICE
CERTIFICATE OF CORRECTION

Patent No. 2,852,519                                          September 16, 1958

Carl W. Kruse

It is hereby certified that error appears in the printed specification of the above numbered patent requiring correction and that the said Letters Patent should read as corrected below.

Column 4, line 8, for "freezing" read -- freeing --; column 7, lines 18 and 19, for "alcohold" read -- alcohol --; column 8, line 12, list of references cited, under the heading "UNITED STATES PATENTS, for "Apr. 14, 1956" read -- Aug. 14, 1956 --.

Signed and sealed this 24th day of February 1959.

(SEAL)

Attest:

KARL H. AXLINE
Attesting Officer

ROBERT C. WATSON
Commissioner of Patents